(12) United States Patent
Hu et al.

(10) Patent No.: US 7,554,767 B1
(45) Date of Patent: Jun. 30, 2009

(54) ELECTRICAL LAPPING GUIDE DISPOSED LATERALLY RELATIVE TO A SHIELD PEDESTAL

(75) Inventors: Yining Hu, Fremont, CA (US); Jun Liu, San Ramon, CA (US); Yingjian Chen, Fremont, CA (US); Mark D. Thomas, Hollister, CA (US); Kroum S. Stoev, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 616 days.

(21) Appl. No.: 11/172,773

(22) Filed: Jul. 1, 2005

(51) Int. Cl.
*G11B 5/127* (2006.01)
*B24B 49/00* (2006.01)

(52) U.S. Cl. .................. 360/125.3; 451/5; 29/603.16

(58) Field of Classification Search .............. 360/125.3, 360/125.71; 29/603.16, 603.07, 603.12, 29/603.15, 603.18; 451/57, 5, 8
See application file for complete search history.

(56) References Cited

U.S. PATENT DOCUMENTS

| | | | |
|---|---|---|---|
| 5,179,938 A | 1/1993 | Lonky | |
| 5,494,473 A | 2/1996 | Dupuis et al. | |
| 5,588,199 A * | 12/1996 | Krounbi et al. | 29/603.1 |
| 5,597,340 A | 1/1997 | Church et al. | |
| 5,761,790 A * | 6/1998 | Carr et al. | 29/603.15 |
| 6,027,397 A | 2/2000 | Church et al. | |
| 6,034,849 A * | 3/2000 | Takizawa | 360/128 |
| 6,083,081 A * | 7/2000 | Fukuroi et al. | 451/5 |
| 6,093,083 A * | 7/2000 | Lackey | 451/28 |
| 6,193,584 B1 * | 2/2001 | Rudy et al. | 451/5 |
| 6,195,871 B1 * | 3/2001 | Watanuki | 29/603.09 |
| 6,223,420 B1 * | 5/2001 | Lee et al. | 29/603.14 |
| 6,347,983 B1 | 2/2002 | Hao et al. | |
| 6,447,367 B1 | 9/2002 | Kozu et al. | |
| 6,532,646 B2 * | 3/2003 | Watanuki | 29/603.12 |
| 6,568,992 B1 * | 5/2003 | Angelo et al. | 451/8 |
| 6,594,112 B1 | 7/2003 | Crue et al. | |
| 6,609,948 B1 * | 8/2003 | Fontana et al. | 451/5 |
| 6,623,330 B2 * | 9/2003 | Fukuroi | 451/5 |
| 6,663,817 B1 * | 12/2003 | Chang et al. | 264/400 |
| 6,674,610 B1 | 1/2004 | Thomas et al. | |
| 6,699,102 B2 * | 3/2004 | Reiley et al. | 451/8 |
| 6,728,067 B2 * | 4/2004 | Crawforth et al. | 360/234.3 |
| 6,758,722 B2 | 7/2004 | Zhu | |
| 6,786,803 B2 | 9/2004 | Crawforth et al. | |
| 6,793,557 B2 * | 9/2004 | Bunch et al. | 451/5 |
| 6,884,148 B1 * | 4/2005 | Dovek et al. | 451/5 |
| 6,886,239 B2 * | 5/2005 | Kasahara et al. | 29/603.13 |
| 7,149,061 B2 | 12/2006 | Yamakura et al. | |

(Continued)

*Primary Examiner*—Brian E Miller
(74) *Attorney, Agent, or Firm*—Barcelo & Harrison LLP

(57) ABSTRACT

Methods are provided for fabricating an electrical lapping guide, and for using the electrical lapping guide to fabricate a transducer of a magnetic recording head. Additionally, transducers comprising an electrical lapping guide are also provided. Methods of fabricating the electrical lapping guide comprise forming a resistive element proximate to a shield pedestal. Accordingly, the resistive element is both aligned with the shield pedestal in a transverse direction, and closely spaced from the shield pedestal in a longitudinal direction. The resistance of the resistive element correlates well with a throat height of the shield pedestal, and the correlation is utilized in the methods of fabricating the transducer. When a magnetoresistive stripe is uses as a second electrical lapping guide while fabricating the transducer, the two can be used to control a tilt angle in the transverse direction during lapping.

10 Claims, 10 Drawing Sheets

U.S. PATENT DOCUMENTS

| | | | |
|---|---|---|---|
| 7,356,909 B1 * | 4/2008 | Min et al. | 29/603.16 |
| 7,430,098 B1 | 9/2008 | Song et al. | |
| 2002/0001671 A1 * | 1/2002 | Fukuroi et al. | 427/131 |
| 2002/0053129 A1 * | 5/2002 | Watanuki | 29/603.07 |
| 2004/0009739 A1 | 1/2004 | Zhu | |
| 2004/0075940 A1 | 4/2004 | Bajorek et al. | |
| 2005/0070206 A1 * | 3/2005 | Kasiraj et al. | 451/5 |
| 2005/0185345 A1 * | 8/2005 | Ding et al. | 360/319 |
| 2006/0196040 A1 * | 9/2006 | Cyrille et al. | 29/603.12 |
| 2007/0246761 A1 * | 10/2007 | Beach et al. | 257/295 |
| 2007/0266549 A1 * | 11/2007 | Gill et al. | 29/603.12 |

* cited by examiner

ELECTRICAL LAPPING GUIDE DISPOSED LATERALLY RELATIVE TO A SHIELD PEDESTAL

FIELD OF THE INVENTION

The present invention relates generally to the field of magnetic recording and more particularly to magnetic heads for perpendicular recording.

BACKGROUND

Perpendicular magnetic recording is a recording technique in which magnetic data bits on a magnetic recording disk are defined such that their magnetic moments are perpendicular to the plane of the magnetic recording disk, as opposed to in the plane of the disk as occurs with longitudinal magnetic recording. The progress to perpendicular recording from longitudinal recording is seen as one of the advances that will allow the continued increase in data densities on magnetic recording disks in the coming years.

A recording head comprises a transducer 100, and a slider 101 (only a portion of which is shown in the various figures so that their scale might allow a clear depiction of the transducer structure). FIG. 1 shows a cross-sectional view of a transducer 100 according to the prior art. The transducer 100 comprises a perpendicular recording write element 105 and a read element 110 that both terminate at a terminus surface (TS). The terminus surface of the transducer 100 is approximately parallel to an air bearing surface (ABS) of a slider 101 and can be either coplanar with the ABS or slightly offset therefrom, usually with a slight amount of recession. The read element 110 includes two shields 115 and a magnetoresistive (MR) stripe 120.

The perpendicular recording write element 105 includes a bottom pole 125, a writer pole 130, a top shield 135, and a shield pedestal 140. The bottom and writer poles 125 and 130 are joined together to form a first yoke. The first yoke includes coil windings 145 disposed between the bottom and writer poles 125 and 130. The writer pole 130, top shield 135, and shield pedestal 140 are also joined together to form a second yoke, and the second yoke also includes coil windings 150 disposed between the writer pole 130 and the top shield 135. Additionally, the second yoke further includes a gap layer 155 disposed between the writer pole 130 and the top shield pedestal 140 in the vicinity of the terminus surface. Also shown in FIG. 1 are a number of encapsulating layers 157, formed typically of a dielectric material such as alumina ($Al_2O_3$).

Of particular concern to the performance of the write element 105 is a throat height (TH) of the shield pedestal 140. The throat height is defined as a distance between the terminus surface and a back edge 160 of the shield pedestal 140. The throat height, as well as a depth of the MR stripe 120 as measured from the terminus surface (i.e., the stripe height, SH), are commonly defined by a lapping process that forms the terminus surface. To better appreciate the difficulty in controlling the throat height during the lapping process it is useful to understand the overall fabrication process.

Fabrication of the transducer 100 is typically performed in a batch process in which multiple recording heads, each including a transducer 100, are formed on a wafer and then cut apart. Starting with the bare wafer, multiple patterned layers of magnetic, electrically conductive, and dielectric materials are deposited through well known deposition and planarization techniques to provide rows of unfinished perpendicular recording heads. After the deposition steps have been completed, the transducers of these unfinished perpendicular recording heads resemble the transducer 100 of FIG. 1 except that the terminus surface has not yet been defined and the layers that will be exposed at the terminus surface extend beyond where the terminus surface will ultimately be defined (to the left of the TS in FIG. 1).

Next, rows (sometimes referred to as slider bars) of unfinished perpendicular recording heads are cut from the wafer. The cutting process produces a face on each bar that is then polished back to form the terminus surface. The polishing process is typically a lapping process, and during the lapping process the layers that will be exposed at the terminus surface are also polished back. The importance of accurately determining when to stop lapping will be apparent, as this determines the position of the terminus surface and the critical dimensions of the throat height and stripe height. Overlapping, for example, can completely remove the MR stripe 120.

It will also be understood that the face that is lapped to form the terminus surface has two dimensions, a longitudinal direction that extends perpendicular to the plane of the drawing in FIG. 1 and a transverse direction that extends from top to bottom in the plane of the drawing. Multiple unfinished perpendicular recording heads extend along the bar in the longitudinal direction. In the prior art, considerable attention has been directed to controlling the lapping process in the longitudinal direction so that the transducer 100 on each of the unfinished perpendicular recording heads on the bar are lapped to approximately the same degree. Absent such control, many transducers are either overlapped or underlapped.

Controlling the lapping process in the longitudinal direction is typically achieved through the use of electric lapping guides (ELGs) that are placed in multiple locations on the bar, for example, at both ends and the center. An ELG is commonly a metal layer between two electrical contacts that is exposed at the face and lapped concurrently with the rest of the bar. In some instances the MR stripe 120 can be used as an ELG. Lapping the ELG causes the electrical resistance measured between the two contacts to increase. Lapping can be controlled in the longitudinal direction, therefore, by monitoring the ELGs along a bar and adjusting the pressure being applied to the bar at different locations along its length. In this way each transducer 100 along the length of the bar is lapped at approximately the same rate. Lapping is terminated when the resistance measured across some or all of the ELGs exceeds some threshold.

FIG. 2 shows a cross-sectional view of the transducer 100 of FIG. 1 and illustrates the effect of not controlling tilt in the transverse direction during lapping. A dashed line in FIG. 2 indicates the position of the TS from the example of FIG. 1, and TS' is the terminus surface defined through lapping without controlling transverse tilt. As can be seen from FIG. 2, when lapping is controlled by the resistance of the MR stripe 120, or by an ELG disposed near the MR stripe 120, a very slight tilt of the bar with respect to the transverse direction can seriously overlap or underlap the shield pedestal 140. Comparing FIGS. 1 and 2, the stripe height is essentially the same in both examples, however the throat height in FIG. 2 is approximately half of the throat height in FIG. 1. It has been found, for instance, that a mere 1° tilt in the transverse direction can translate into a 0.15µ difference in the throat height.

Therefore, what is needed is a way to better control the throat height when lapping to form a terminus surface of a transducer.

SUMMARY

An exemplary magnetic recording head of the present invention comprises a transducer including a write element and an electrical lapping guide. The write element includes a writer pole and a shield pedestal disposed above the writer pole. The writer pole is separated from the shield pedestal by a gap layer. The shield pedestal has a first back edge defining a first plane, and the shield pedestal extends from a terminus surface to the first back edge. In some embodiments, a distance, known as a throat height, between the terminus surface and the first back edge is less than about 0.15µ. The electrical lapping guide includes a resistive element disposed above the writer pole and laterally disposed relative to the shield pedestal. The resistive element has a second back edge defining a second plane that is essentially parallel to the first plane.

Methods of fabricating an electrical lapping guide are also provided. In an exemplary embodiment, such a method comprises forming a gap layer of a dielectric material above a writer pole layer, forming a patch of an electrically conductive material above the gap layer, forming a mask layer over the gap layer, the mask layer including an ELG opening above the patch and a shield pedestal opening laterally disposed relative to the patch, and forming a shield pedestal layer within the shield pedestal opening and forming an ELG mask within the ELG opening. The exemplary method further comprises removing the mask layer, selectively removing the patch except for a resistive element portion covered by the ELG mask, and removing the ELG mask to expose the resistive element portion. In some embodiments, the method can further comprise forming a seed layer over the gap layer before forming the mask layer. In these embodiments selectively removing the patch can include removing the seed layer except where the seed layer is covered by the shield pedestal layer and the ELG mask.

The present invention also provides methods of fabricating a transducer. In an exemplary embodiment, such a method comprises providing a substrate, forming a writer pole above the substrate, forming a gap layer above the writer pole, forming a shield pedestal layer above the gap layer, the shield pedestal layer having a first back edge defining a first plane, and forming an electrical lapping guide including a resistive element layer above the writer pole and laterally disposed relative to the shield pedestal layer, the resistive element layer having a second back edge defining a second plane essentially parallel to the first plane. The exemplary embodiment further comprises dividing a slider bar from the substrate, the slider bar including a lapping face, the lapping face being essentially parallel to the first and second planes and exposing the shield pedestal layer and the resistive element layer. The exemplary embodiment additionally comprises lapping the lapping face of the slider bar while monitoring a first electrical resistance measured across the electrical lapping guide, and stopping the lapping when the first electrical resistance reaches a predetermined threshold.

In some embodiments of the method of fabricating the transducer, providing the substrate includes forming a magnetoresistive stripe layer. In these embodiments lapping the lapping face of the slider bar while monitoring the first electrical resistance can further include monitoring a second electrical resistance across the magnetoresistive stripe layer. Some of these embodiments further comprise adjusting a lapping tilt angle as a function of the first and second electrical resistances.

The present invention also provides methods of fabricating a transducer. In an exemplary embodiment, such a method comprises providing a substrate, forming a writer pole above the substrate, forming a gap layer above the writer pole, forming a shield pedestal layer above the gap layer, and forming an electrical lapping guide including a resistive element layer above the writer pole and laterally disposed relative to the shield pedestal layer, the electrical lapping guide comprising an electrical path from a first ELG bonding pad through the resistive element and to a second ELG bonding pad thereof. The exemplary method further comprises dividing a slider bar from the substrate, the slider bar including a lapping face, and forming a shield pedestal from the shield pedestal layer by lapping the lapping face of the slider bar while monitoring an electrical resistance measured across the electrical lapping guide until a desired throat height of the shield pedestal is achieved. The exemplary method further comprises dividing the head from the slider bar, the head including a slider and a transducer, the transducer including the resistive element layer and the shield pedestal, and forming an air bearing surface on the slider including forming a channel extending across the transducer that breaks the electrical path from the first ELG bonding pad to the second ELG bonding pad.

DETAILED DESCRIPTION OF THE EXEMPLARY EMBODIMENTS

Figure 1:
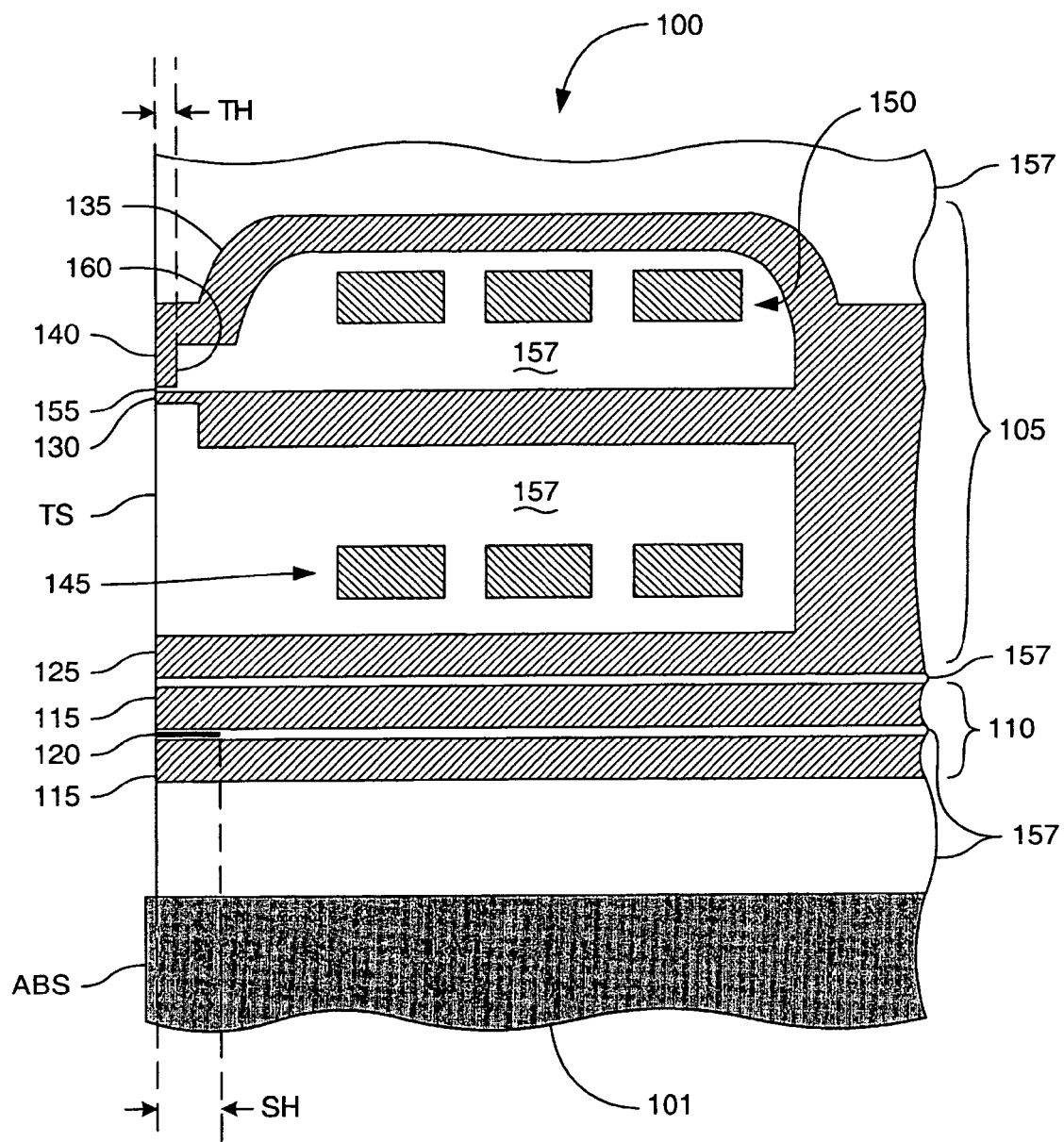
FIG. 1 is a cross-sectional view of a perpendicular recording head according to the prior art.
Figure 2:
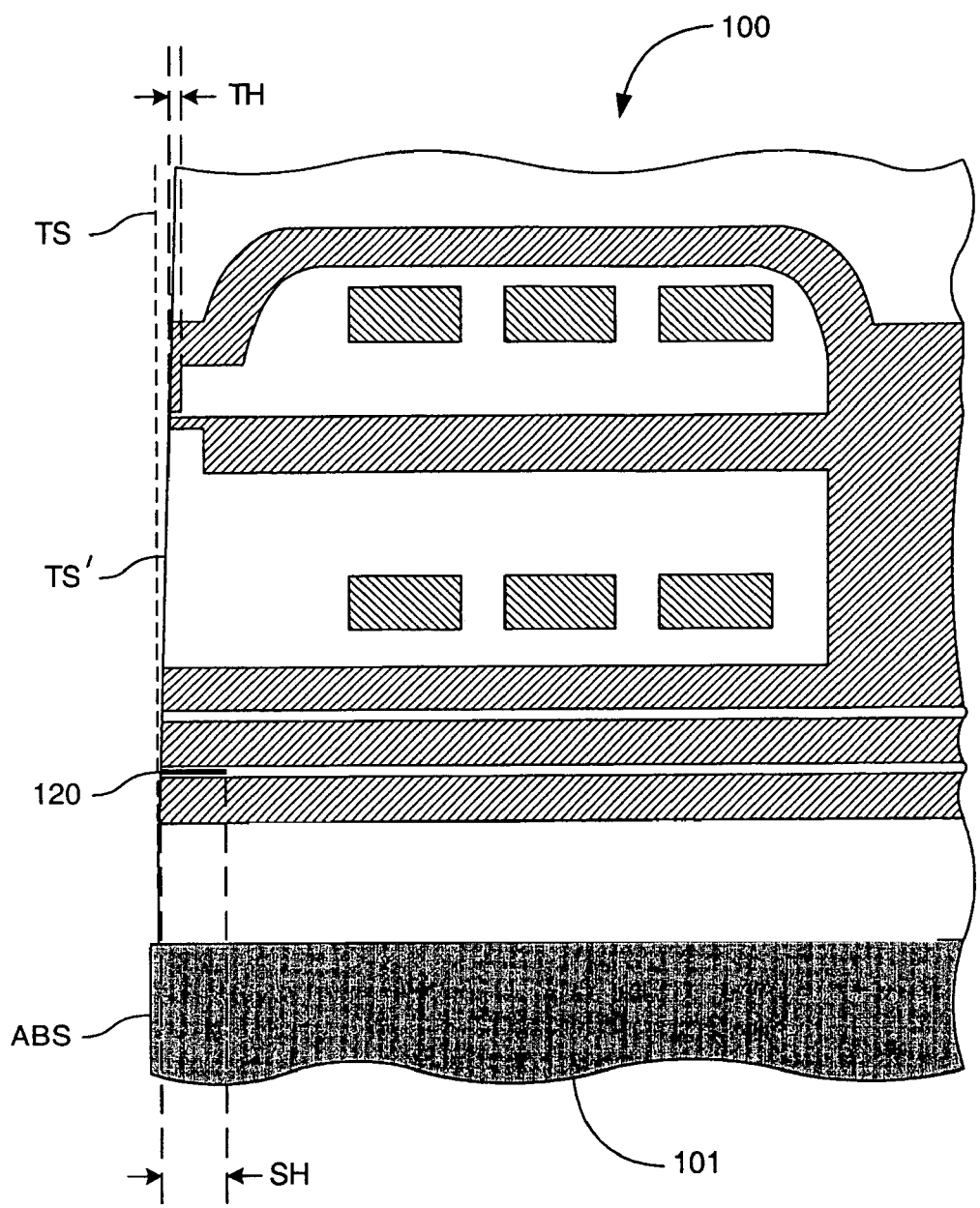
FIG. 2 is a cross-sectional view of the perpendicular recording head of FIG. 1 showing the effect of tilt in the transverse direction during lapping.
Figure 3:
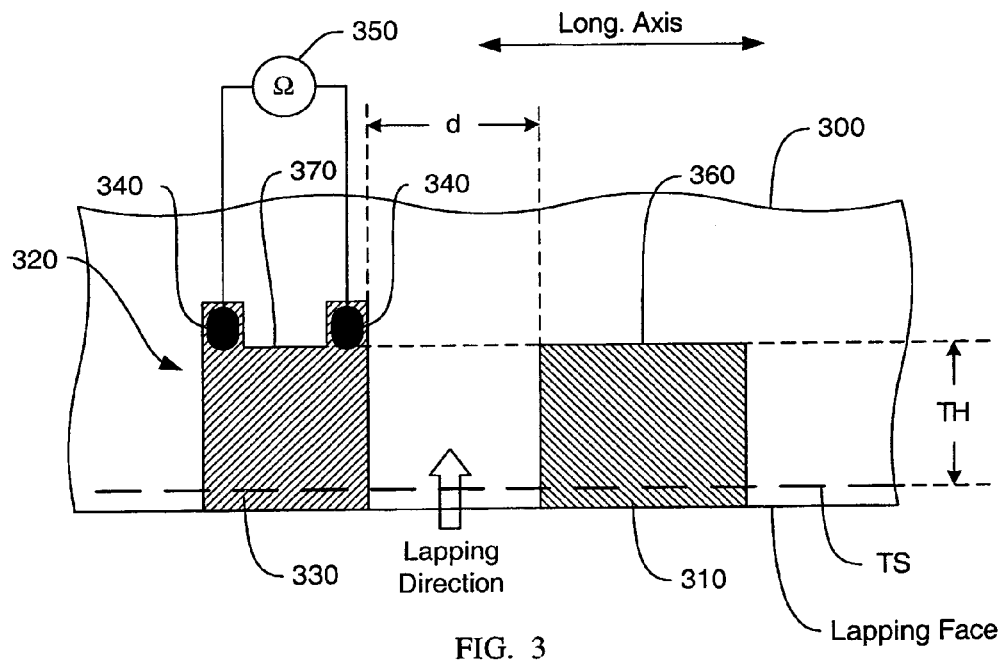
FIG. 3 is a cross-sectional view taken through an exemplary unfinished transducer and particularly through a shield pedestal thereof, according to an embodiment of the present invention.

FIG. 3 shows a cross-sectional view taken through an unfinished transducer 300 and particularly through a shield pedestal layer 310 thereof. In FIG. 3, the longitudinal direction of FIGS. 1 and 2 is indicated. As shown, a terminus surface (TS) is defined by lapping a lapping face of a bar of unfinished perpendicular recording heads, each including a transducer 300, until the desired terminus surface is reached. In the embodiment shown in FIG. 3, the desired terminus surface is reached when a throat height (TH) of the shield pedestal layer 310 is within a narrow range, for example 0.15µ to 0.20µ. It will be understood that although the terms "lapping" and "lapping face" are specific to a particular polishing process known in the art, the invention is not limited to lapping but is equally applicable to any material removal technique that can controllably and uniformly remove material from the lapping face to provide a suitably smooth surface.

In order to control the lapping process such that the lapping can be stopped when the throat height is within the desired range, the unfinished transducer 300 also comprises an electrical lapping guide 320 that includes a resistive element layer 330 coupled between two electrical contacts 340. An electrical measurement device, such as an ohm-meter 350, can be coupled to the electrical contacts 340 to monitor an electrical resistance across the resistive element layer 330 during the lapping process. It will be appreciated that as the lapping face is lapped, material is removed from both the shield pedestal layer 310 and the resistive element layer 330. Further, as material is removed from the resistive element layer 330, the resistance measured across the resistive element layer 330 increases.

Figure 4:
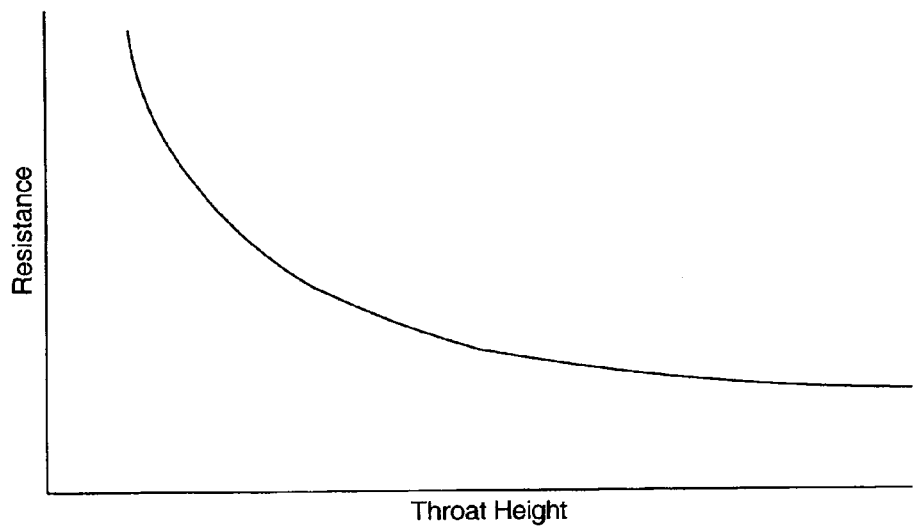
FIG. 4 is a graph correlating the electrical resistance of an exemplary electrical lapping guide, according to an embodiment of the present invention, as a function of the throat height of an associated shield pedestal.

The resistive element layer 330 of the electrical lapping guide 320 is situated in close proximity to the shield pedestal layer 310 so that measurements made of the resistive element layer 330 are representative of the state of the shield pedestal layer 310. Accordingly, as shown in FIG. 4, the throat height of the shield pedestal layer 310 can be correlated to the resistance measured across the resistive element layer 330. As the throat height decreases, the resistance of the resistive element layer 330 increases.

Close proximity between the resistive element layer 330 and the shield pedestal layer 310 may be achieved, in part, by situating the resistive element layer 330 on the same side of a writer pole (not shown) of the unfinished transducer 300 as the shield pedestal layer 310. In FIG. 3, the writer pole is disposed below the plane of the drawing. As used herein, "above" and "below" are used to indicate orientation with respect to the transverse direction (see FIGS. 1 and 2). In FIG. 3, the transverse direction is perpendicular to the plane of the drawing; thus, both the shield pedestal layer 310 and the resistive element layer 330 are disposed above the writer pole.

Close proximity may be further achieved by minimizing a lateral separation, d, measured in the longitudinal direction between the resistive element layer 330 and the shield pedestal layer 310. Because of the small lateral separation, it will be appreciated that the electrical lapping guide 320 of FIG. 3 will ultimately be incorporated within the finished transducer. It will also be appreciated that the lateral separation should not be made too small to avoid having the resistive element layer 330 excessively influence the shape of the fringing magnetic field around the shield pedestal during writing operations. Accordingly, in some embodiments, a suitable separation between the resistive element layer 330 and the shield pedestal layer 310 is between about 100µ and 250µ.

In some embodiments, as shown in FIG. 3, a back edge 360 of the shield pedestal layer 310 is aligned with a back edge 370 of the resistive element layer 330 so that the resistance measured across the resistive element layer 330 approaches infinity as the throat height approaches zero. In other embodiments it is sufficient for the planes defined by the back edges 360, 370 to be essentially parallel instead of coplanar. Further, the thickness of the resistive element layer 330 in the transverse direction, and the width in the longitudinal direction, can both be chosen so that when the throat height is within the desired range, the resistance of the resistive element layer 330 is in an approximately linear portion of the graph shown in FIG. 4, and the resistances that correspond to the limits of the desired throat height range are well separated.

Figure 5:
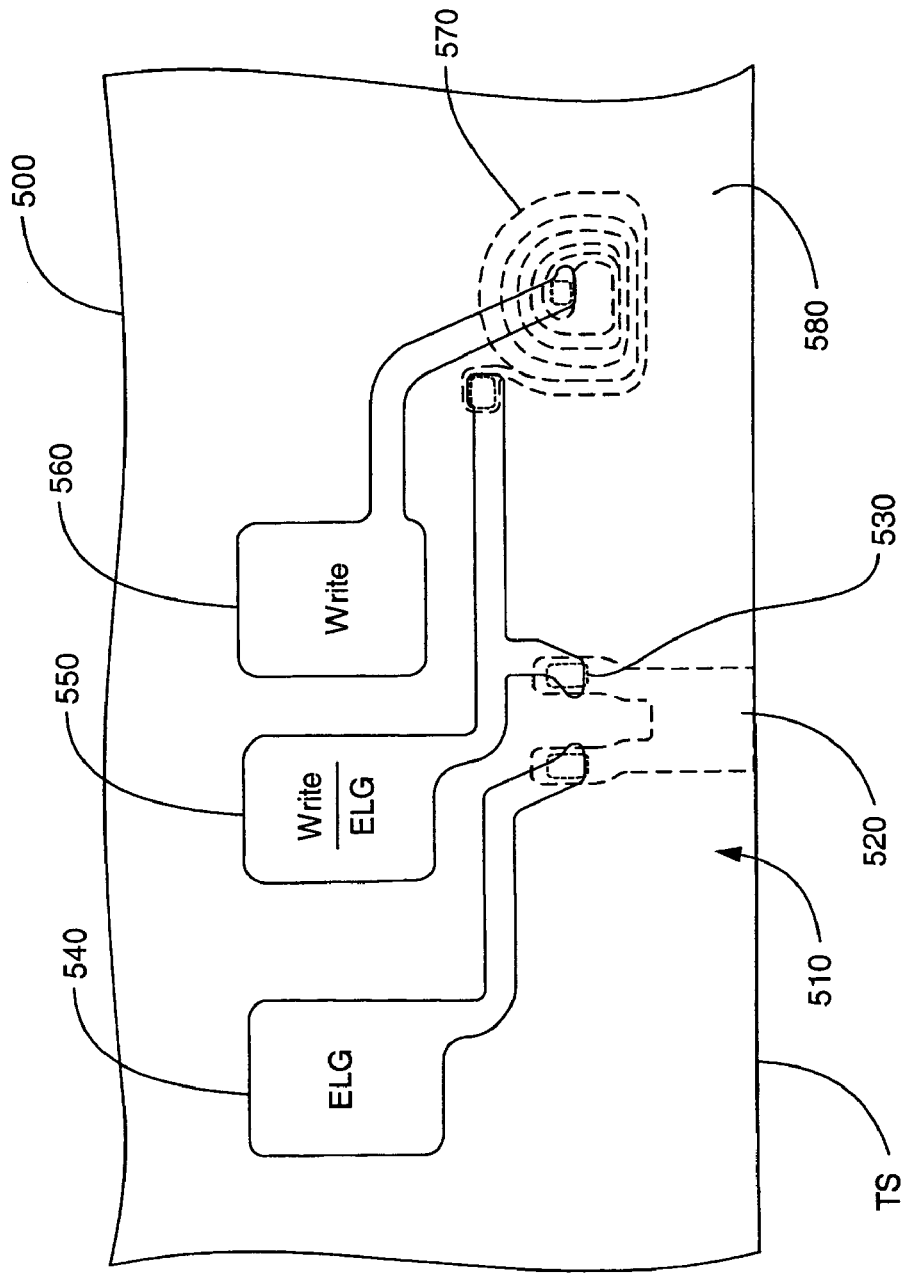
FIG. 5 is a top view of an exemplary transducer of the present invention showing exemplary electrical connections that comprise part of an electrical lapping guide.

FIG. 5 shows a top view of an exemplary transducer 500 of the present invention to show one example of the electrical connections that comprise part of an electrical lapping guide 510. The electrical lapping guide 510 comprises a resistive element 520, two electrical contacts 530, an ELG bonding pad 540, and a combined ELG/write bonding pad 550. A write circuit comprises the ELG/write bonding pad 550, a dedicated write bonding pad 560, and a coil 570, as shown. The presence of the electrical path through the electrical lapping guide 510 that is connected to the write circuit by the ELG/write bonding pad 550 does not meaningfully affect the writing performance of the transducer 500 because the ELG bonding pad 540 is only employed during lapping and otherwise the electrical lapping guide 510 constitutes an open circuit.

Although the embodiment shown in FIG. 5 combines one of the ELG bonding pads with one of the write bonding pads, it will be understood that this is for improved space utilization and is not essential to the invention. Alternately, two independent ELG bonding pads can be employed. Likewise, the electrical lapping guide 510 can comprise a combined ELG/read bonding pad and an ELG bonding pad, where two read bonding pads serve a comparable function in a read circuit. Other arrangements of read and write circuits that can be readily adapted to include an electrical lapping guide and a ELG bonding pad are taught by U.S. Pat. No. 6,674,610 issued to Thomas et al., which is incorporated herein by reference.

It is noted that the resistive element 520, electrical contacts 530, and coil 570 are shown as dashed lines in FIG. 5 to denote that they are buried layers within the transducer 500, however, FIG. 5 should not be read to imply that any of these layers are necessarily at the same distance below a surface 580 that includes bonding pads 540-560, nor that the features are drawn to scale. It will also be recognized that although the electrical contacts 530 are shown as vias between the resistive element layer 520 and the traces that extend from the bonding pads 540 and 550, the electrical contacts 530 can be implemented more generally by an arbitrary series of traces and interconnects.

FIGS. 6-11 illustrate a method of fabricating an electrical lapping guide according to an exemplary embodiment of the present invention. The method comprises forming a gap layer of a dielectric material above a writer pole layer, forming a patch of an electrically conductive material above the gap layer, forming a mask layer over the gap layer, the mask layer including an ELG opening above the patch and a shield pedestal opening laterally disposed relative to the patch, and forming a shield pedestal layer within the shield pedestal opening and forming an ELG mask within the ELG opening. The method further comprises removing the mask layer, selectively removing the patch except for a resistive element portion covered by the ELG mask, and removing the ELG mask to expose the resistive element portion.

Figure 6:
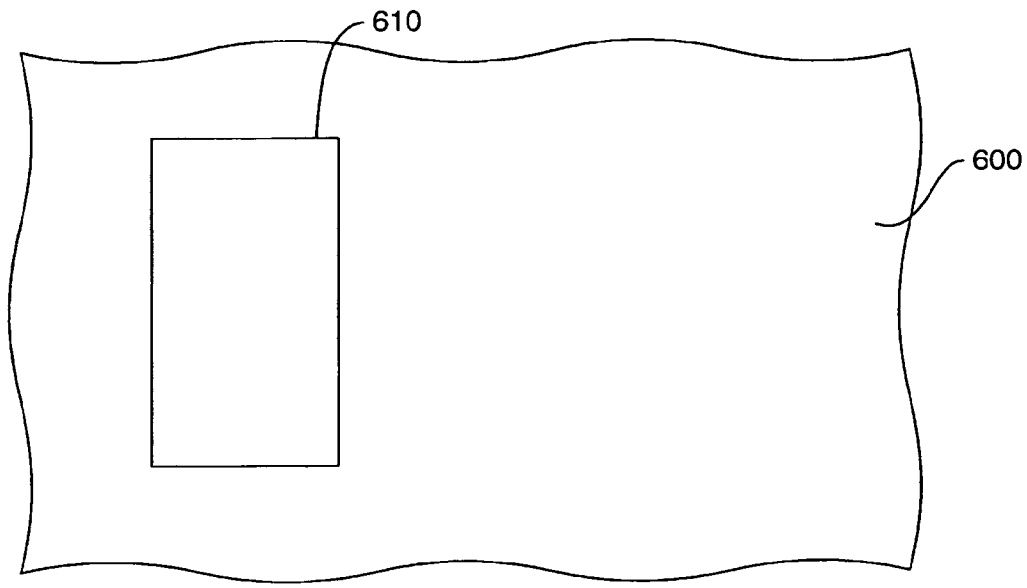
FIGS. 6-11 illustrate steps of an exemplary method of fabricating an electrical lapping guide according to an embodiment of the present invention.

FIG. 6 shows the steps of forming a gap layer 600 above a writer pole layer (not shown, below the plane of the drawing), and forming a patch 610 above the gap layer 600. The gap layer 600 is formed of a dielectric material such as alumina by a deposition technique such as sputtering and can be planarized to provide a highly smooth and flat surface upon which to build further layers. With reference to FIG. 1, it will be appreciated that gap layer 600 is typically formed above a writer pole that can be a common component of two yokes. In these embodiments the method can include forming a first yoke, such as the first yoke that includes bottom pole 125 and writer pole 130 (FIG. 1), before forming the gap layer 600. The method can also include forming a read element, such as read element 110 (FIG. 1) before forming the first yoke.

It will be appreciated that although the transducer 100 (FIG. 1) provides a useful illustration for describing an embodiment of the method of the invention and the transducer 100 includes two yokes, the first yoke that includes bottom pole 125 is not essential to the methods or the transducers of the invention. Some transducers of the invention employ only the second yoke that includes top pole 135 and writer pole 130 (FIG. 1). In methods of the invention that are directed to forming such transducers, the method can also include forming a read element, such as read element 110 (FIG. 1), before forming the writer pole 130.

The patch 610 ultimately will become a resistive element layer in the electrical lapping guide and therefore the patch 610 is formed of an electrically conductive material. Noble metals like gold and ruthenium work particularly well in those embodiments that employ chemical etching in a further step. The patch 610 can be formed by well known masking and deposition techniques such as photoresist patterning and sputtering.

Figure 7:
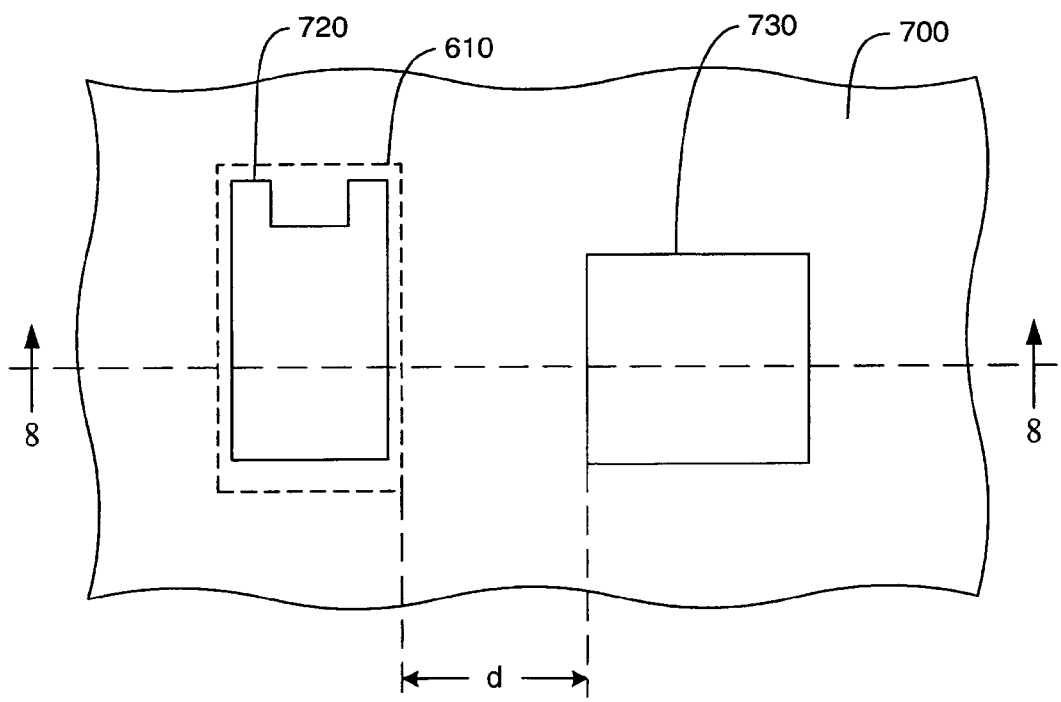
Figure 8:
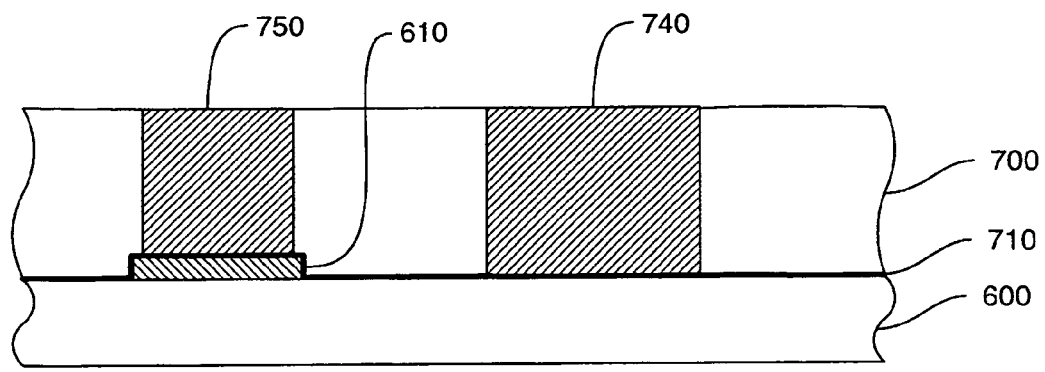

FIGS. 7 and 8 show the step of forming a mask layer 700 over the gap layer 600, and the optional step of forming a seed layer 710 over the gap layer 600 before forming the mask layer 700. FIG. 7 shows a top view while FIG. 8 shows a cross-section taken along the line 8-8 in FIG. 7. In the step of forming the mask layer 700, the mask layer 700 includes two openings, an ELG opening 720 above the patch 610 and a shield pedestal opening 730 laterally disposed relative to the patch 610 by a separation, d. Forming the mask layer 700, in some embodiments, can include patterning a layer of photoresist. The optional seed layer 710 may be a very thin electrically conductive layer, such as copper, that is advantageous for electroplating on non-conducting surfaces. The seed layer 710 can be omitted where the subsequent step of forming a shield pedestal layer 740 and forming an ELG mask 750 (see FIG. 8) are performed by a method that does not require a seed layer, such as sputtering. The seed layer 710 can be formed, for example, by sputtering.

FIG. 8 additionally shows the step of forming the shield pedestal layer 740 within the shield pedestal opening 730 and forming the ELG mask 750 within the ELG opening 720. In some embodiments, forming the shield pedestal layer 740 and the ELG mask 750 includes plating, such as electroplating. Although the illustrated embodiment shows the shield pedestal layer 740 and the ELG mask 750 being formed from the same material, such as by plating a high moment magnetic material, it is noted that alternatively the two features can be formed separately from different materials by utilizing additional masking and deposition steps. It will be appreciated that the shield pedestal layer 740 of FIG. 7 will become a shield pedestal layer, like the shield pedestal layer 310 in FIG. 3, in a finished transducer, and therefore should be fabricated from a suitable magnetic material. However, the ELG mask 750 is ultimately sacrificial (see FIG. 11) and is only formed from the same magnetic material as the shield pedestal layer 740 for simplified processing, in some embodiments.

Figure 9:
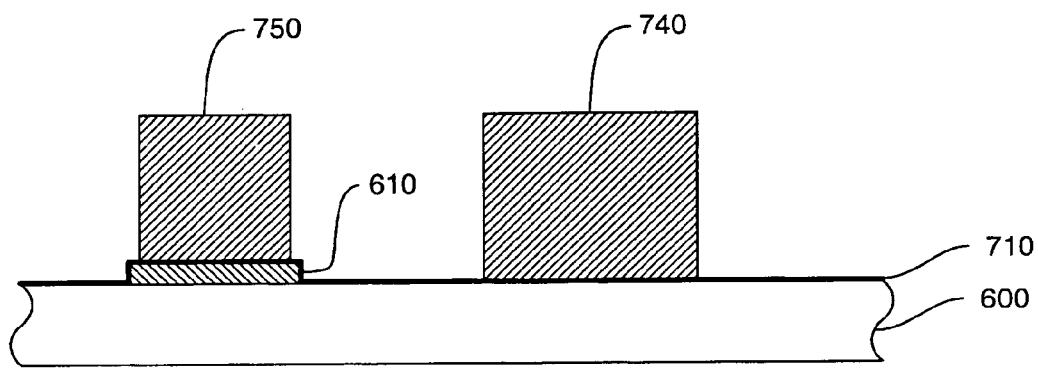
Figure 10:
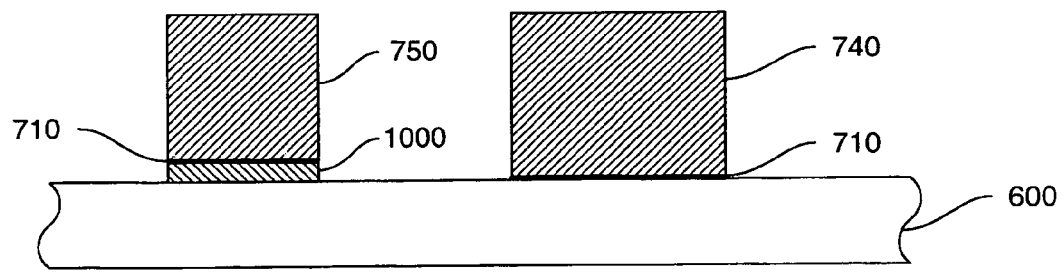
Figure 11:
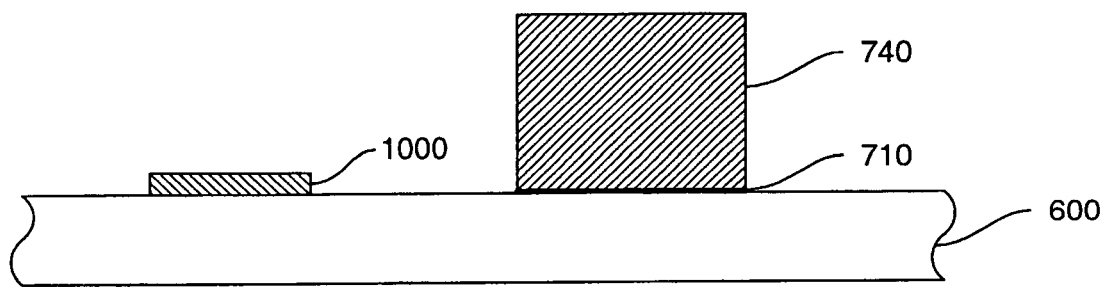

FIGS. 9-11 show the steps of removing the mask layer 700 (FIG. 9), selectively removing the patch 610 except for a resistive element portion 1000 covered by the ELG mask 750 (FIG. 10), and removing the ELG mask 750 to expose the resistive element portion 1000 (FIG. 11). Selectively removing the patch 610 can be achieved, for instance, by plasma etching. Removing the ELG mask 750 can be achieved by wet chemical etching, for example. In these embodiments, the chemical etchant is chosen to readily remove the ELG mask 750 while being essentially unreactive with respect to the material of the resistive element portion 1000. The shield pedestal layer 740 can be protected from the chemical etchant by a further masking step (not shown) that masks the shield pedestal layer 740 but leaves the ELG mask 750 exposed. Thus, in some embodiments, the step of removing the ELG mask can include masking the shield pedestal layer 740 before etching.

It can be seen from FIGS. 10 and 11 that a bottom surface of the shield pedestal layer 740 may be parallel with a bottom surface of the resistive element portion 1000, and offset only by a thickness of the seed layer 710, and it will be appreciated that the two surfaces may be coplanar in those embodiments that do not employ the seed layer 710. Accordingly, the resistive element portion 1000 and the shield pedestal layer 740 may be aligned with each other in the transverse direction, as well as being proximate to each other in the longitudinal direction, making the resistive element portion 1000 a good proxy for the shield pedestal layer 740 during a subsequent lapping step of a method of fabricating a transducer. Because of this arrangement, in the finished transducer a bottom surface of the shield pedestal may be substantially coplanar with a bottom surface of the resistive element.

In those embodiments of the method in which the seed layer 710 is formed over the gap layer 600 before the mask layer 700 is formed, the step of selectively removing the patch 610 can include removing the seed layer 610 except where the seed layer 610 is covered by the shield pedestal layer 740 and the ELG mask 750, as shown in FIG. 10. Removing the seed layer 610 from between the shield pedestal layer 740 and the ELG mask 750 prevents the electrical lapping guide from electrically coupling the write circuit to the yoke in the finished transducer. Also, although the resistive element portion 1000 is only shown in cross-section in FIGS. 10 and 11, it will be understood that the resistive element portion 1000 has the same footprint as the ELG mask 750 which has the same footprint as the ELG opening 720 (FIG. 7).

The exemplary method of fabricating the electrical lapping guide can further comprise forming a pair of electrical contacts 340 (FIG. 3) on the resistive element portion 1000. The electrical contacts can be formed, for example, by plating. Additionally, the method can further comprise forming additional electrical traces and bonding pads necessary to couple the resistive element portion 1000 to a measurement device. In some embodiments, forming such bonding pads includes forming either a combined ELG/write bonding pad or a combined ELG/read bonding pad, as described above.

Figure 12:
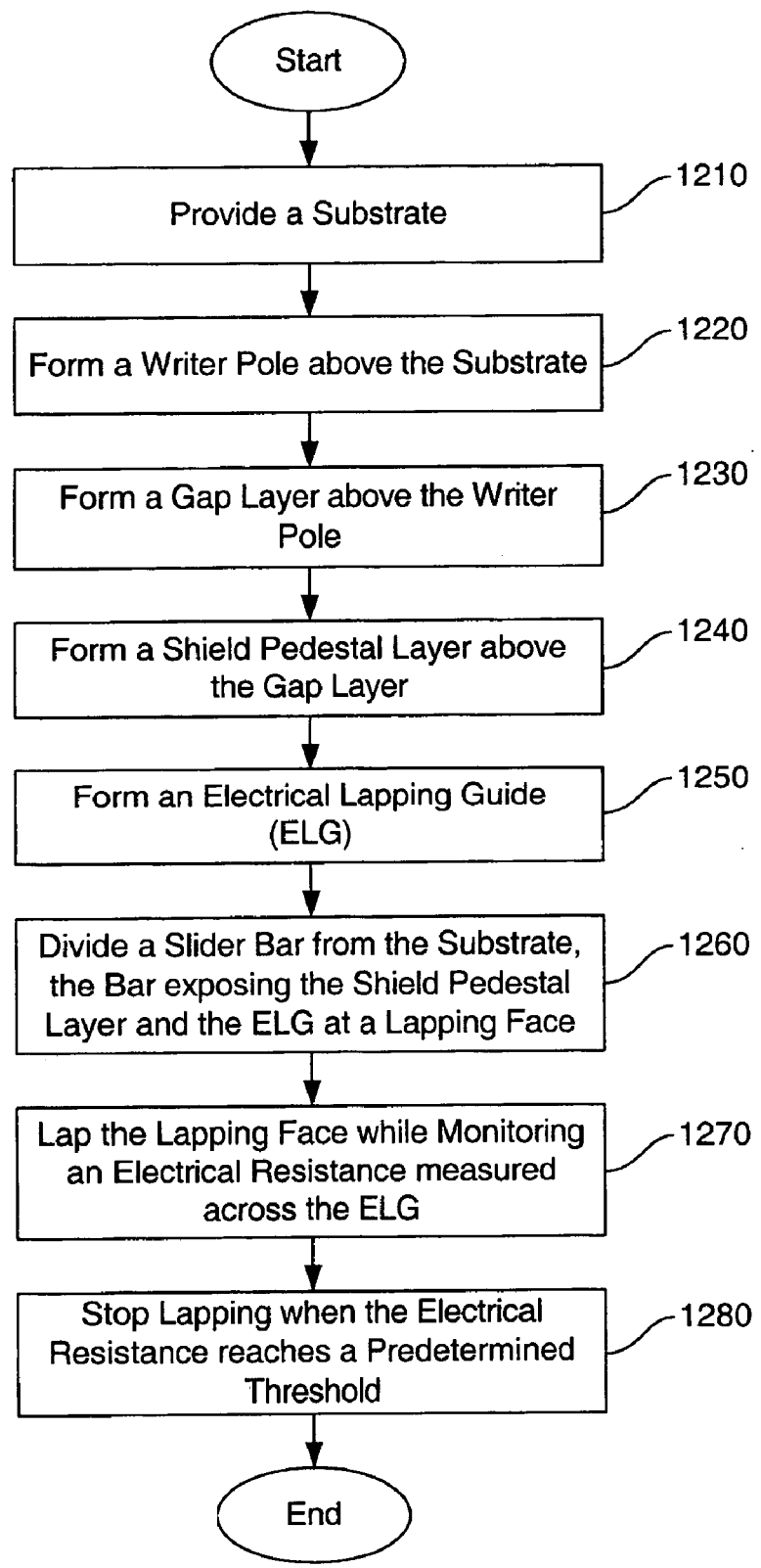
FIG. 12 is a flow-chart illustrating an exemplary method of fabricating a transducer according to an embodiment of the present invention.

FIG. 12 is a flow-chart illustrating an exemplary method of fabricating a transducer. The transducer can comprise either a longitudinal or perpendicular write element. Embodiments of the method can be particularly advantageous with respect to fabricating perpendicular recording transducers because they allow the throat height of a shield pedestal to be precisely defined. The exemplary method of fabricating the transducer includes steps for forming on a substrate, such as a wafer, an unfinished transducer that includes an electrical lapping guide, a step for dividing from the substrate a slider bar that includes the unfinished transducer, and steps for completing the transducer by utilizing the electrical lapping guide.

According to the exemplary method, multiple unfinished magnetic recording heads are fabricated in parallel on the substrate, a slider bar comprising a plurality of unfinished magnetic recording heads is divided from the substrate, where each unfinished magnetic recording head includes transducer having an electrical lapping guide. Magnetic recording heads are completed from the plurality of unfinished magnetic recording heads on a slider bar by utilizing one or more of the electrical lapping guides to control a lapping process that defines the throat heights of the transducers of the magnetic recording heads. Although the exemplary method is suitable for fabricating magnetic recording heads in parallel, as noted above, the method will be described generally with respect to a single transducer of a single recording head for simplicity.

As noted, the exemplary method of fabricating the transducer includes steps for forming on a substrate an unfinished transducer that includes an electrical lapping guide. These steps comprise a step 1210 of providing a substrate, a step 1220 of forming a writer pole above the substrate, a step 1230 of forming a gap layer above the writer pole, a step 1240 of forming a shield pedestal layer above the gap layer, and a step 1250 of forming an electrical lapping guide. Providing the substrate in step 1210 can include providing a wafer, and forming a read element on the wafer. Step 1210 can optionally comprise forming components of a first yoke, as discussed above.

Step 1220 is directed to forming the writer pole above the substrate. The writer pole can be, for example, a lower pole in a single-yoke transducer, or a writer pole such as writer pole 130 in a dual-yoke design like that shown in FIG. 1. The writer pole is formed of a magnetic material, and preferably a material with a high magnetic moment, by a method such as plating. Step 1230 is directed to forming the gap layer above the writer pole. Aspects of forming the gap layer are discussed above with respect to FIG. 6.

In step 1240 the shield pedestal layer, including a first back edge that defines a first plane, is formed above the gap layer. In step 1250 the electrical lapping guide including a resistive element layer is formed. The resistive element layer is formed both above the writer pole and laterally disposed relative to the shield pedestal layer. Additionally, the resistive element layer has a second back edge defining a second plane that is essentially parallel to the first plane defined by the back edge of the shield pedestal layer. Aspects of forming the shield pedestal layer and the electrical lapping guide are discussed in detail above with respect to FIGS. 6-11.

It should be noted that in FIGS. 6-11 the resistive element layer 1000 is formed above the gap layer 600, however, the method of the invention is not so limited and only requires forming the resistive element layer above the writer pole. Accordingly, forming the electrical lapping guide can include, for example, etching a cavity in the gap layer and depositing the resistive element layer within the cavity. In such an embodiment the resistive element layer would not be formed above the gap layer but would still be formed above the writer pole.

As also noted, the exemplary method of fabricating the transducer includes a step 1260 for dividing from the substrate a slider bar that includes the unfinished transducer. In step 1260 dividing the slider bar from the substrate includes forming a lapping face on the slider bar, where the lapping face exposes the shield pedestal layer and the resistive element layer and is essentially parallel to the first and second planes defined by the two back edges. Dividing the slider bar from the substrate can be achieved, for example, by cutting with a diamond saw.

As further noted above, the exemplary method of fabricating the transducer also includes steps for completing the transducer by utilizing the electrical lapping guide. These steps include a step 1270 directed to lapping the lapping face of the slider bar while monitoring a first electrical resistance measured across the electrical lapping guide, and a step 1280 of stopping the lapping when the first electrical resistance reaches a predetermined value. Although not illustrated in FIG. 12, the method can further comprise, either before step 1270 or after step 1280, a step of dividing the transducer from the slider bar so that the transducer includes the electrical lapping guide.

Monitoring the first electrical resistance in step 1270 can be accomplished, for example, by coupling an electrical measurement device, such as an ohm-meter, to the bonding pads of the electrical lapping guide. The electrical resistance measured during step 1270 may follow a curve such as that shown in FIG. 4, increasing as the resistive element and the shield pedestal layers are both lapped shorter. The curve can be calibrated so that the throat height of the shield pedestal will be known accurately during lapping. When the first electrical resistance measured across the electrical lapping guide enters a predetermined resistance range, or reaches a predetermined threshold, the throat height is acceptable and lapping stops in step 1280.

Figure 13:
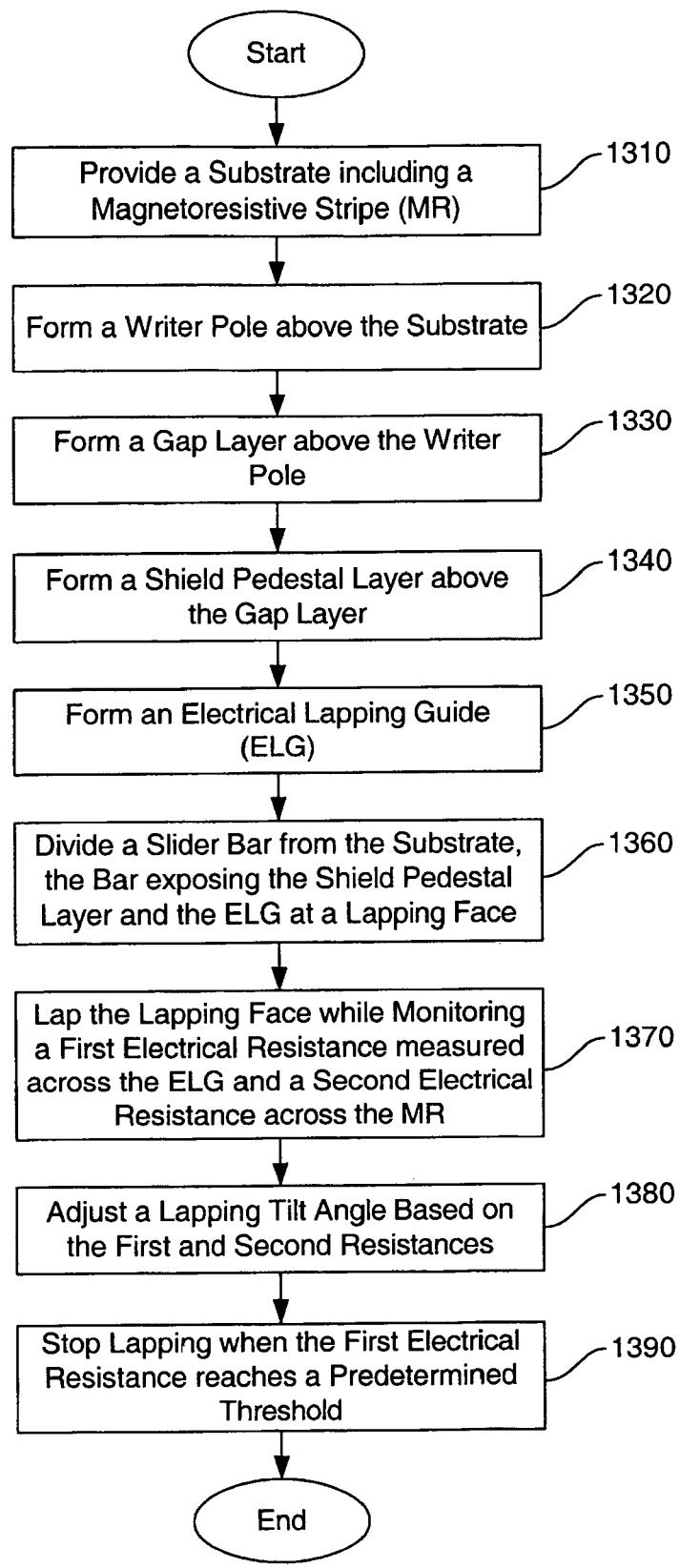
FIG. 13 is a flow-chart illustrating another exemplary method of fabricating a transducer according to an embodiment of the present invention.

FIG. 13 is a flow-chart illustrating another exemplary method of fabricating a transducer. As in the previous exemplary embodiment, the transducer can include either a longitudinal or a perpendicular write element. Embodiments of this method can be particularly advantageous with respect to fabricating perpendicular recording transducers because they allow the throat height of a shield pedestal and the MR stripe height to both be precisely defined. As above, this exemplary method is suitable for fabricating transducers in parallel, but is described generally with respect to a single transducer for simplicity.

The exemplary method of FIG. 13 includes steps for forming on a substrate an unfinished transducer that includes an electrical lapping guide, and a step for dividing from the substrate a slider bar that includes the unfinished transducer. These steps comprise a step 1310 of providing a substrate including a magnetoresistive stripe, a step 1320 of forming a writer pole above the substrate, a step 1330 of forming a gap layer above the writer pole, a step 1340 of forming a shield pedestal layer above the gap layer, a step 1350 of forming an electrical lapping guide, and a step 1360 of dividing a slider bar from the substrate. Providing the substrate in step 1310 can include providing a wafer and forming a read element on the wafer where the magnetoresistive stripe is a component of the read element. Step 1310 can optionally comprise forming components of a first yoke, as discussed above. Steps 1320-1360 are essentially the same as steps 1220-1260 described above.

The exemplary method of FIG. 13 also includes steps for completing the transducer by utilizing the electrical lapping guide. These steps include a step 1370 directed to lapping the lapping face of the slider bar while monitoring a first electrical resistance measured across the electrical lapping guide and a second electrical resistance measured across the magnetoresistive stripe, a step 1380 of adjusting a lapping tilt angle based on the first and second electrical resistances, and a step 1390 of stopping the lapping when the first electrical resistance reaches a predetermined value. Although not illustrated in FIG. 13, the method can further comprise, either before step 1370 or after step 1390, a step of dividing the transducer from the slider bar so that the transducer includes the electrical lapping guide.

Monitoring the first electrical resistance in step 1370 can be accomplished, for example, by coupling an electrical measurement device, such as an ohm-meter, to bonding pads of the electrical lapping guide. Likewise, monitoring the second electrical resistance in step 1370 can be accomplished by coupling an electrical measurement device to bonding pads of a read circuit that includes the magnetoresistive stripe. The second electrical resistance may follow a curve similar to that shown in FIG. 4, with the second resistance increasing as the magnetoresistive stripe is lapped shorter. The curve can be calibrated so that the stripe height of the magnetoresistive stripe will be known accurately during lapping. When the first electrical resistance enters a predetermined resistance range, or reaches a predetermined threshold, the throat height is acceptable and lapping stops in step 1390.

The exemplary method of FIG. 13 also includes the step 1380 of adjusting a lapping tilt angle based on the first and second electrical resistances. Here, the tilt angle is an angle of the lapping face relative to the transverse direction. With reference to FIG. 2, the tilt angle is the angle between the terminus surface of FIG. 1 (TS) and the terminus surface TS'. It will be appreciated that if the first and second electrical resistances are calibrated against the throat height and stripe height, respectively, then by monitoring both resistances it is possible to know the throat height and the stripe height at any time during the lapping process. It is also possible to determine the rates of change of the throat height and the stripe height to determine how rapidly each is being lapped. From this information the tilt angle between the lapping face and the lapping medium in the transverse direction can be adjusted.

It is noted that after the transducer is completed, as discussed above, the transducer, including the electrical lapping guide, is divided from the slider bar. This typically involves dividing a head, comprising the transducer and a slider, from the slider bar. Thereafter, further processing is directed to forming the air bearing surface (ABS) on the slider. Forming the ABS on the slider can be achieved, for example, by etching. As is well known, the ABS can have a complex topography in order to generate a desired pressure profile under the slider, and this topography typically includes raised pads separated by stepped or recessed regions or channels. In some embodiments of the present invention, at least one such channel may extend across the terminus surface.

Figure 14:
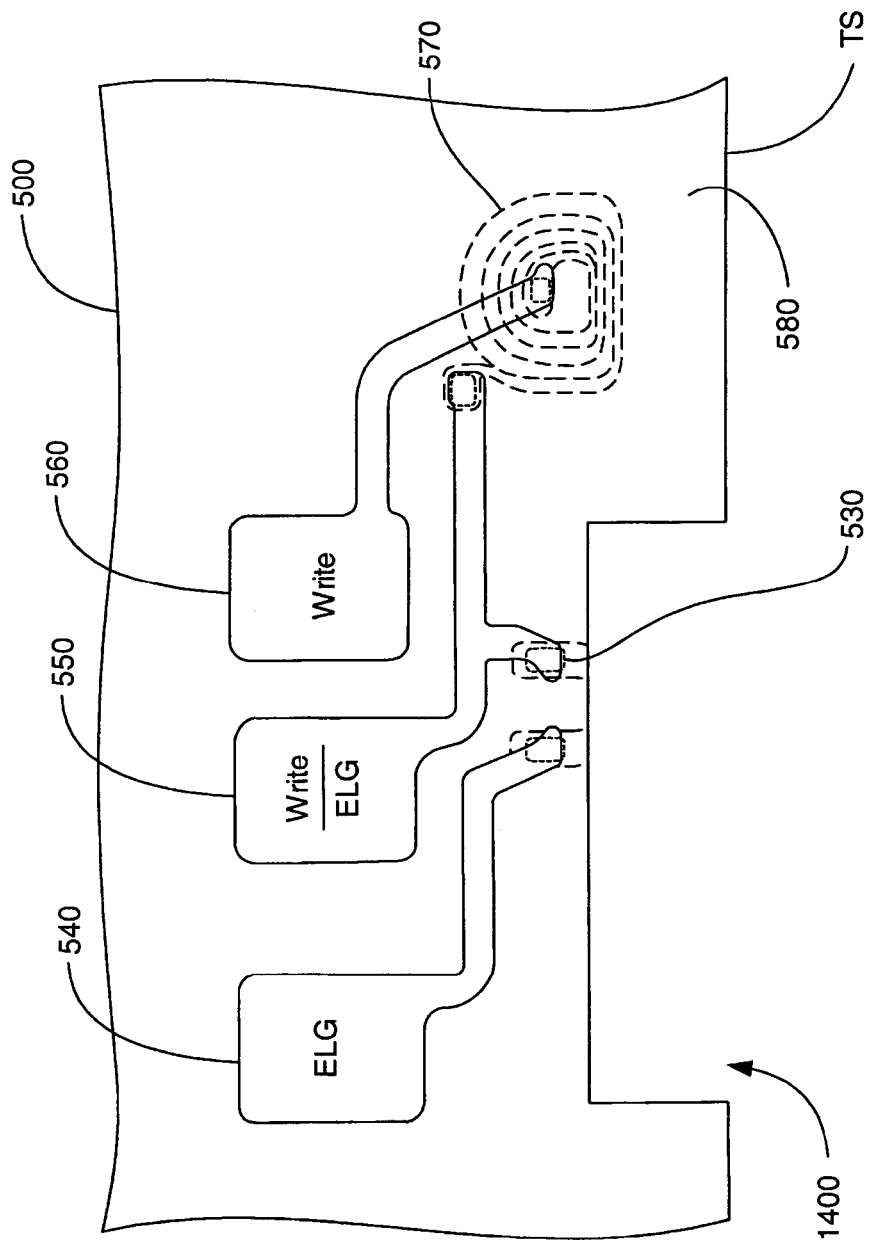
FIG. 14 is a top view of the exemplary transducer of FIG. 5 showing a channel of the air bearing surface extending across the transducer.

FIG. 14 shows the exemplary transducer of FIG. 5 after further processing to create the ABS. In this embodiment a channel 1400 of the ABS extends across the terminus surface and removes enough of the resistive element 520 so that the electrical connection between the ELG bonding pad 540 and the combined ELG/write bonding pad 550 is severed. In some embodiments, as noted above, the open circuit ending at the ELG bonding pad 540 is inconsequential to the operation of the write circuit, and breaking the electrical connection through the resistive element 520 is likewise inconsequential.

However, other embodiments share the ELG bonding pad 540 with another circuit, and in these embodiments it is advantageous to electrically separate the ELG bonding pad 540 from the write circuit to isolate the write circuit from any other circuit that uses the ELG bonding pad 540. For example, in some embodiments the ELG bonding pad 540 is one of two bonding pads (the other not shown in FIG. 14) that provide electrical connections to a dynamic fly height heater (DFH) that is used to deliberately induce pole tip protrusion to decrease the spacing between the magnetic disk and the transducer during operation. For such embodiments, the resistive element 520 of the electrical lapping guide is laterally disposed relative to the shield pedestal in a location where the channel 1400 will be defined. Thus, for example, in some embodiments the channel 1400 extends across the terminus surface to one side of the shield pedestal and therefore the resistive element 520 is placed on the same side of the shield pedestal. It will be appreciated that the channel 1400 in FIG. 14 removes most of the material from the resistive element 520 before the electrical path is broken, but the same result can also be achieved, for instance, by etching through one of the traces of the electrical lapping guide while leaving the resistive element 520 intact.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of fabricating an electrical lapping guide (ELG), the method comprising:
providing a substrate;
forming a writer pole layer above the substrate;
forming a gap layer of a dielectric material above the writer pole layer;
forming a patch of an electrically conductive material above the gap layer;
forming a mask layer over the gap layer, the mask layer including an ELG opening above the patch and a shield pedestal opening laterally disposed relative to the patch;
forming a shield pedestal layer within the shield pedestal opening and forming an ELG mask within the ELG opening;
removing the mask layer;
removing the patch except for a resistive element portion covered by the ELG mask; and
removing the ELG mask to expose the resistive element portion.

2. The method of claim 1 wherein forming the patch includes sputtering a noble metal.

3. The method of claim 2 wherein sputtering the noble metal includes sputtering gold.

4. The method of claim 1 further comprising forming a seed layer over the gap layer before forming the mask layer.

5. The method of claim 4 wherein removing the patch includes removing the seed layer except where the seed layer is covered by the shield pedestal layer and the ELG mask.

6. The method of claim 1 wherein forming the mask layer includes patterning a layer of photoresist.

7. The method of claim 1 wherein forming the shield pedestal layer and the ELG mask includes plating.

8. The method of claim 1 wherein removing the patch includes plasma etching.

9. The method of claim 1 wherein removing the ELG mask includes wet chemical etching.

10. The method of claim 1 further comprising forming a pair of electrical contacts on the resistive element portion.

* * * * *